United States Patent Office 3,563,692
Patented Feb. 16, 1971

3,563,692
DIETHYLAMINOETHYLATED CELLULOSE WEAK BASE ANION EXCHANGER CONTAINING SULFHYDRYL GROUPS
Truman L. Ward and Ruth R. Benerito, New Orleans, La., assignors to the United States of America as represented by the Secretary of Agriculture
No Drawing. Filed Apr. 25, 1969, Ser. No. 819,468
Int. Cl. D06m *13/08, 13/28*
U.S. Cl. 8—120     1 Claim

ABSTRACT OF THE DISCLOSURE

This invention relates to the production of partial cellulose ethers containing sulfhydryl groups and with weak base anion exchange properties through reaction of diethylaminoethylated cellulose with chlorinated thiirane compounds in the presence of certain alcohols.

---

A nonexclusive, irrevocable, royalty-free license in the invention herein described, throughout the world for all purposes of the United States Government, with the power to grant sublicenses for such purposes, is hereby granted to the Government of the United States of America.

A primary object of the present invention is to provide at will a method for preparing some cellulose ethers with weak base exchange properties and sulfhydryl groups.

Prior art processes are known for the preparation of diethylaminoethylated (DEAE) cotton. The method of M. Hartman (U.S. Pat. No. 1,777,970, Oct. 7, 1930) produced diethylaminoethylated cotton with weak anion exchange properties. His product did not contain sulfhydryl groups. Soignet (patent applied for) added hydroxyl groups and obtained products with strong base anion exchange properties. His product did not contain sulfhydryl the tertiary amine groups of the DEAE cotton.

In contrast to the prior art, this invention relates to addition of SH groups, rather than OH, at cellulosic hydroxyl group sites rather than at tertiary amine groups sites to produce a material that possesses weak ion exchange properties.

Stewart [J. Org. Chem. 29, 1655 (1964)] observed a close analogy between reaction of oxirane and thiirane compounds with primary and secondary amines and Soignet [J. Appl. Polymer Sci., 11, 1155 (1967)] found that 1-chloro 2,3-epoxypropane reacted with the tertiary amino groups in DEAE cotton through a normal opening of the oxirane ring and concomitant loss of chlorine to form a quaternary amine with strong anion exchange properties and very little covalent chlorine content. From these observations prior art would not anticipate the instant invention.

Base catalysts favor opening of thiiranes analogous to the opening of the corresponding oxiranes. Neutral or acidic conditions favor abnormal ring opening, that is cleavage of the bond between S and the secondary carbon atom [Davies, W. and Savige, W. E., J. Chem. Soc. 774 (1951)]. In presence of slightly basic conditions, the RS⁻ ion is a weaker base than the corresponding RO⁻ ion, but the greater nucleophilicity of RS⁻ as compared to RO⁻ results in a nucleophilic attack of RS⁻ on unopened thiirane to form polymers. Usually with the corresponding epoxide, termination of ROH rather than polymerization occurs.

The following equations show the probable course of the reaction:

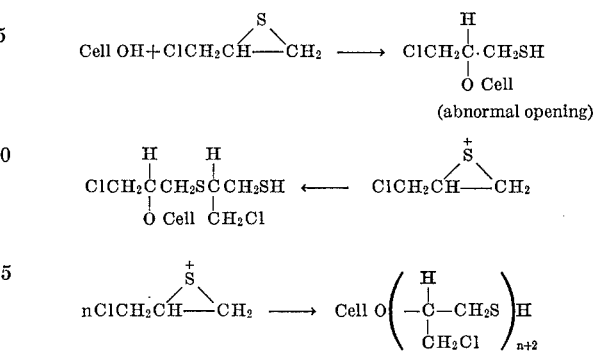

(abnormal opening)

The above is favored by neutral or acidic conditions. With such catalysts, the oxygen analog has less tendency than the thiirane to form an "onium ion." With such an abnormal ring opening, the chlorine atoms should not be lost through dehydrohalogenation because the chlorine and sulfhydryl groups are not adjacent. This would have covalent chlorine in the finished reaction product.

In the present invention, a diethylaminoethylated cotton fabric is treated by refluxing in a 10% solution of 1-chloro-2,3-epithiopropane in either n-octyl or t-pentyl alcohol. After reaction the sample is removed from the reaction chamber and thoroughly washed in methanol followed by distilled water.

EXAMPLE 1

A 12-inch square of 80 x 80 diethylaminoethylated cotton weighing about 10 g. was refluxed for a period of about 4 hours in 100 ml. of a 10% by weight solution of 1-chloro-2,3-epithiopropane in t-pentyl alcohol. After reaction, the sample was washed well with absolute methanol followed by distilled water. Potentiometric titrations established that the material is a weak base anion exchanger. Oxidation with 0.5% aqueous $KBrO_3$ for 24 hours at 26° C. established that the sulfur exists as SH groups. The sample contained 1.23% chlorine and 0.58% sulfur.

EXAMPLE 2

Same as Example 1 except that n-octyl alcohol was used rather than t-pentyl alcohol. The product had 1.14% Cl and 0.58% sulfur. The product was a weak-base anion exchanger and the SH groups were oxidizable.

EXAMPLE 3

Same as Example 1 except that a reaction period of 8 hours was used rather than 4 hours. The product was a weak-base anion exchanger and the SH groups were oxidizable. The product had a 1.79% Cl and 0.89% sulfur.

We claim:
1. A process for producing partial cellulose ethers in fabric form that are weak base anion exchangers comprising:
  (a) refluxing a diethylaminoethylated cellulose in fabric form with a solution containing about 10 weight percent of 1-chloro-2,3-epithiopropane dissolved in an alcohol selected from a group consist- ing of n-octyl alcohol and t-pentyl alcohol, for a period of about 4 to 8 hours and (b) washing the fabric free of excess reagents.

References Cited

Soignet et al.: Journal of Applied Polymer Science, vol. 11, pp. 1155–1172 (1967).

Stewart: Journal of Organic Chemistry, vol. 29, pp. 1655–1657 (1964).

Davies et al.: Journal of the Chemical Society, pp. 774–779 (1951).

GEORGE F. LESMES, Primary Examiner

J. CANNON, Assistant Examiner

U.S. Cl. X.L.

260—2.1, 231; 8—116.2